(12) United States Patent
Baker et al.

(10) Patent No.: US 9,853,778 B2
(45) Date of Patent: *Dec. 26, 2017

(54) ARQ SYSTEM WITH STATUS AND PACKET ACKNOWLEDGEMENT

(71) Applicant: KONINKLIJKE PHILIPS N.V., Eindhoven (NL)

(72) Inventors: Matthew P. J. Baker, Canterbury (GB); Timothy J. Moulsley, Caterham (GB)

(73) Assignee: Koninklijke Philips N. V., Eindhoven (NL)

( * ) Notice: Subject to any disclaimer, the term of this patent is extended or adjusted under 35 U.S.C. 154(b) by 180 days.

This patent is subject to a terminal disclaimer.

(21) Appl. No.: 14/658,985

(22) Filed: Mar. 16, 2015

(65) Prior Publication Data

US 2015/0188672 A1 Jul. 2, 2015

Related U.S. Application Data

(63) Continuation of application No. 13/645,916, filed on Oct. 5, 2012, now Pat. No. 9,025,548, which is a
(Continued)

(30) Foreign Application Priority Data

Aug. 13, 2002 (GB) .................................. 0218737.5
Aug. 16, 2002 (GB) .................................. 0219138.5

(51) Int. Cl.
*H04L 1/18* (2006.01)
*H04L 5/14* (2006.01)
(Continued)

(52) U.S. Cl.
CPC .......... *H04L 1/1854* (2013.01); *H04L 5/0055* (2013.01); *H04L 5/14* (2013.01);
(Continued)

(58) Field of Classification Search
None
See application file for complete search history.

(56) References Cited

U.S. PATENT DOCUMENTS 4,882,579 A 11/1989 Siwiak
5,297,144 A 3/1994 Gilbert et al.
(Continued)

FOREIGN PATENT DOCUMENTS

JP 2004527179 A 9/2004
WO 9826619 A2 6/1998
WO 2004015911 A1 2/2004

OTHER PUBLICATIONS

LG Electronics, "Acknowledgement Scheme With HS-SCCH Error", TSG-RAN Working Group 1 #24, Orlando, USA, Feb. 2002, TDOC R1-02-0361, 5 Pages.
(Continued)

*Primary Examiner* — Candal Elpenord

(57) ABSTRACT

A communication system comprises a downlink indicator channel for the transmission of an indicator signal indicating that a data packet is scheduled to be transmitted on a downlink data channel from a primary station to a secondary station. In operation, on detection of the indicator signal, the secondary station transmits a status signal, for example a negative acknowledgement signal, on an uplink channel to the primary station immediately before transmission of a positive or negative acknowledgement signal to indicate the status of the received data packet. By providing the primary station with two chances to detect the case where the secondary station fails to detect the indicator signal, peak power requirements of the uplink channel can be reduced, thereby reducing system interference levels.

40 Claims, 5 Drawing Sheets

Related U.S. Application Data continuation of application No. 10/523,940, filed as application No. PCT/IB03/03350 on Jul. 29, 2003, now Pat. No. 8,315,210.

(51) Int. Cl.

| | | |
|---|---|---|
| *H04W 52/02* | (2009.01) | |
| *H04W 72/04* | (2009.01) | |
| *H04L 5/00* | (2006.01) | |
| H04L 1/16 | (2006.01) | |
| H04L 1/12 | (2006.01) | |

(52) U.S. Cl.
CPC ... *H04W 52/0216* (2013.01); *H04W 72/0446* (2013.01); *H04L 1/16* (2013.01); *H04L 1/1803* (2013.01); *H04L 2001/125* (2013.01); *H04W 72/04* (2013.01); *Y02B 60/50* (2013.01)

(56) References Cited

U.S. PATENT DOCUMENTS

| | | | |
|---|---|---|---|
| 5,603,081 A | 2/1997 | Raith et al. | |
| 5,633,874 A | 5/1997 | Diachina et al. | |
| 5,677,918 A | 10/1997 | Tran et al. | |
| 5,729,541 A | 3/1998 | Hamalainen et al. | |
| 5,918,174 A | 6/1999 | Chennakeshu et al. | |
| 5,933,763 A | 8/1999 | Wang et al. | |
| 5,995,500 A * | 11/1999 | Ma | H04W 84/08 370/337 |
| 6,035,209 A | 3/2000 | Tiedemann et al. | |
| 6,052,812 A | 4/2000 | Chen et al. | |
| 6,320,855 B1 | 11/2001 | Shi et al. | |
| 6,430,163 B1 | 8/2002 | Mustajarvi | |
| 6,434,396 B1 | 8/2002 | Rune | |
| 6,449,491 B1 | 9/2002 | Dailey | |
| 6,816,478 B1 | 11/2004 | Laroia et al. | |
| 6,910,168 B2 | 6/2005 | Baker et al. | |
| 7,062,294 B1 | 6/2006 | Rogard et al. | |
| 7,181,223 B1 | 2/2007 | Pecen et al. | |
| 7,185,256 B2 | 2/2007 | Miki et al. | |
| 7,206,280 B1 | 4/2007 | Khan et al. | |
| RE41,178 E | 3/2010 | Ahmavaara | |
| 2002/0064167 A1 | 5/2002 | Khan et al. | |
| 2002/0101835 A1 | 8/2002 | Gerakoulis | |
| 2002/0105970 A1 | 8/2002 | Shvodian | |
| 2002/0108082 A1 | 8/2002 | McDonnell | |
| 2002/0114291 A1 | 8/2002 | Moulsey | |
| 2003/0063583 A1 | 4/2003 | Padovani et al. | |

OTHER PUBLICATIONS

Philips, "Text Proposal for TR25.858 for ACK/NACK Signalling", TSG-RAN WG1 #22, Jeju, South Korea, Nov. 2001M, TSGR(01)1202, 3 Pages.

3GPP2 C.S0003-C, Version 1.0, May 28, 2002, Medium Access Control (MAC) Standard for cdma2000 Spread Spectrum Systems, Release C.

Lucent Technologies;, Variable Rate Channel Quality Indication in HSDPA:, 3GPP TSG-RAN WG1#22, JeJu, Korea, Nov. 19-23, 2001, R1-01-1037, Agenda Item AH32.

Qualcomm Inc., "Reduced Rate Feedback for 1xEV-DV", 3GPP2-C50-20011203-021, Dec. 3, 2001.

Qualcomm Inc., "Details of Reduced Rate R-ACKCH", 3GPP2-C30-20020307-009, Mar. 5, 2002.

LG Electronics, Inc., "Acknowledgement Scheme with HS-SCCH Error", TSG-RAN Working Group 1#24, Orlando, USA, Tdoc R1-02-0361, Feb. 18-22, 2002.

ETSI TS 125 211 V5.1.0 (Jun. 2002) Universal Mobile Telecommunications System (UMTS); Physical channels and mapping of transport channels onto physical channels (FDD) (3GPP TS 25.211 version 5.1.0 Release 5).

* cited by examiner

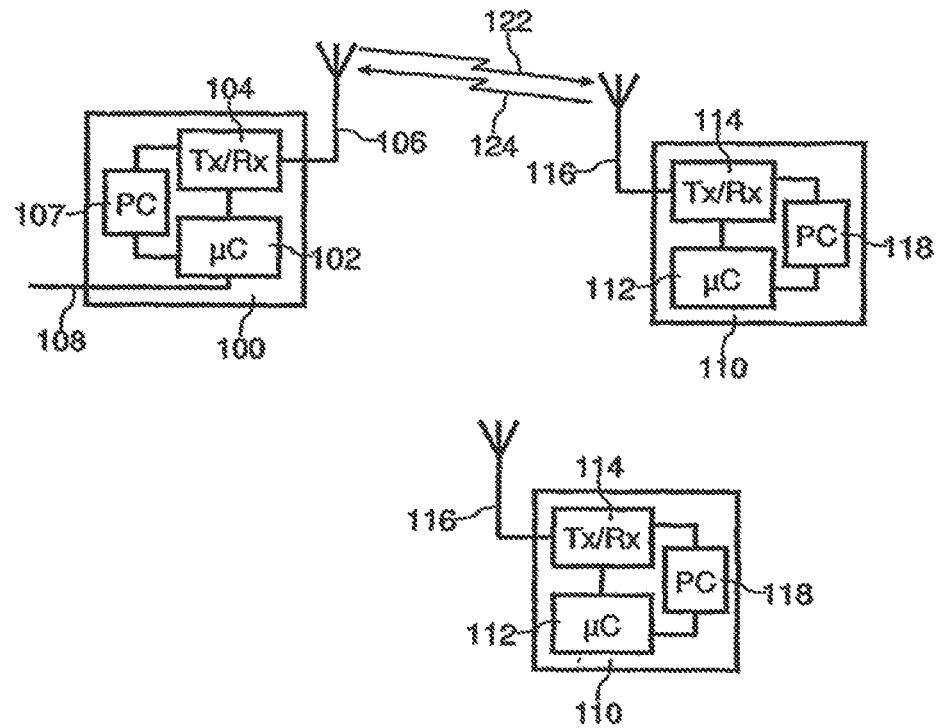
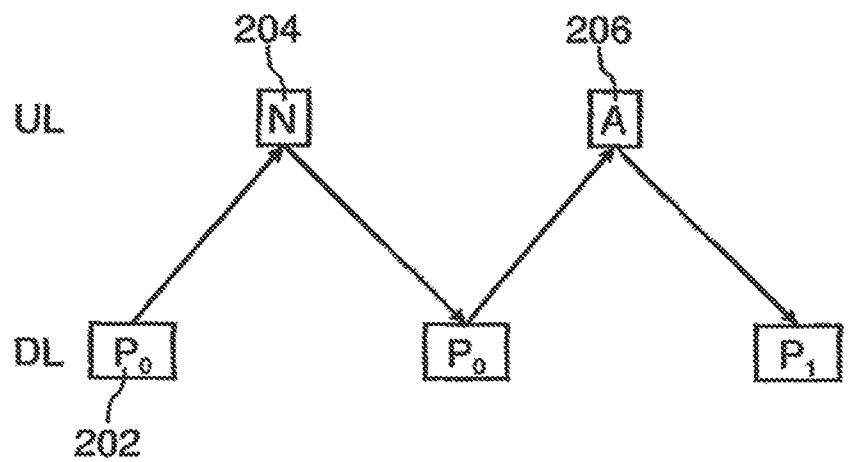
FIG. 1
FIG. 2

ARQ SYSTEM WITH STATUS AND PACKET ACKNOWLEDGEMENT

CROSS REFERENCE TO RELATED APPLICATIONS

The present application claims priority under 35 USC §120 to and is a continuation of U.S. application Ser. No. 13/645,916, filed Oct. 5, 2012 and entitled "ARQ System With Status And Packet Acknowledgement," which claims priority under 35 USC §120 to and is a continuation of U.S. application Ser. No. 10/523,940, now U.S. Pat. No. 8,315,210, filed on Feb. 8, 2005, entitled "ARQ System With Status And Packet Acknowledgement," which claims the benefit of and is the National Stage of International Application No. PCT/IB03/03350, filed on Jul. 29, 2003, which claims the benefit of and right of priority to under 35 USC §119 (b) of Great Britain Applications Nos. GB0218737.5 and GB0219138.5, filed on Aug. 13, 2002 and Aug. 16, 2002, respectively, the contents of each of the aforementioned applications being incorporated by reference herein in their entirety.

FIELD OF THE INVENTION

The present invention relates to a communication system and further relates to primary and secondary stations for use in such a system and to a method of operating such a system. While the present specification describes a system with particular reference to the Universal Mobile Telecommunication System (UMTS), it is to be understood that such techniques are equally applicable to use in other communication systems.

BACKGROUND OF THE INVENTION

There is a growing demand in the mobile communication area for a system having the ability to download large blocks of data to a Mobile Station (MS) on demand at a reasonable rate. Such data could for example be web pages from the Internet, possibly including video clips or similar. Typically a particular MS will only require such data intermittently, so fixed bandwidth dedicated links are not appropriate. To meet this equipment in UMTS, a High-Speed Downlink Packet Access (HSDPA) scheme is being developed which may facilitate transfer of packet data to a mobile station at up to 4 Mbps.

A conventional component of a packet data transmission system is an ARQ (Automatic Repeat request) process, for handling data packets received in error. For example, consider downlink packet transmission from a Base Station (BS) to a Mobile Station (MS) in HSDPA. When the MS receives a data packet it determines whether the packet has been corrupted, for example using Cyclic Redundancy Check (CRC) information. It then transmits a signal in a field allocated for this purpose to the BS, with a first signal used as an acknowledgement (ACK), to indicate that the packet was successfully received, and a second signal used as a negative acknowledgement (NACK), to indicate that the packet was received but corrupted. The signals may for example be different codewords or the same codeword transmitted at different powers. The base station (BS) requires an appropriate position for a decision threshold to be set so that it can decode the ACK/NACK messages correctly.

Since packet transmission is typically intermittent, discontinuous transmission (DTX) may typically be employed, so that nothing is transmitted by the mobile station (MS) in the ACK/NACK field unless a data packet has been received. In a typical scenario, the probability of the mobile station (MS) failing to detect a data packet that has been sent might be 1%. In this case it is desirable for the base station (BS) to interpret the DTX as if it were a NACK, so that the packet may be retransmitted to the MS. Interpreting a discontinuous transmission (DTX) as a NACK may be achieved either by offsetting the decision threshold at the BS towards the ACK signal, or by means of the mobile station (MS) transmitting a NACK in every ACK/NACK field which does not correspond to a packet with correct cyclic redundancy check (CRC), whether or not a packet was detected.

A problem with the mobile station (MS) transmitting in every ACK/NACK field is that uplink interference is significantly increased, and in addition the mobile station (MS) battery life is reduced. This is a particular problem when the packet traffic is bursty (as is often the case), resulting in the mobile station (MS) being required to transmit in many ACK/NACK fields when no packet had been transmitted to it.

A problem with offsetting the threshold for deciding between ACK and NACK commands is that the transmit power of the ACK command needs to be increased, as discussed below, in order to achieve an acceptably low probability of an ACK being interpreted as a NACK. As the probability of the MS transmitting an ACK should be much greater than that of transmitting a NACK in a well-designed communication system, increasing the ACK transmit power will significantly increase the average transmit power required in the ACK/NACK field.

Consider a typical communication system which requires that the probability of misinterpreting an ACK as a NACK is less than 1% and the probability of misinterpreting a NACK as an ACK is less than 0.01%. Assuming that the probability of the mobile station (MS) not detecting a packet is 1%, then the probability of misinterpreting a discontinuous transmission (DTX) as a NACK should be less than 1% (so that the combined probability of the mobile station (MS) not receiving a packet and its DTX being interpreted as an ACK is the same as the probability of misinterpreting a NACK as an ACK, i.e. less than 0.01%). Simulations for typical mobile communication channels have shown that offsetting the decision threshold towards ACK enough to ensure that the probability of misinterpreting DTX as an ACK is less than 1% has the effect of requiring the ACK power to be greater than the NACK power, by as much as 10 or 20dB in some scenarios.

One partial solution, disclosed in our co-pending United Kingdom patent application 0207696.6 (Applicant's reference PHGB 020034), is for the mobile station (MS) to transmit NACKs continuously after its initial ACK/NACK for as long as a timer is running. This avoids the need for the BS to offset its decision threshold, thereby reducing the required ACK power. However, a problem with this scheme is that the BS still has to offset its ACK/NACK decision threshold for the first of a series of packets, or alternatively tolerate a higher mis-detection probability for DTX after the first packet.

SUMMARY

An object of the present invention is to address the above-identified problem.

According to a first aspect of the present invention there is provided a communication system having a downlink indicator channel for the transmission of an indicator signal indicating that a data packet is scheduled to be transmitted on a downlink data channel from a primary station to a secondary station, the secondary station having receiving means for receiving the indicator signal and the data packet, and acknowledgement means for transmitting a signal to the primary station to indicate the status of the received data packet, wherein the secondary station comprises means for transmitting on an uplink channel a status signal to indicate receipt of the indicator signal before transmission of a positive or negative acknowledgement to indicate the status of the received data packet.

By arranging for the secondary station to transmit a status signal to indicate reception of the indicator signal, the primary station has at least two chances to detect the case where the secondary station fails to receive the indicator signal (i.e. the primary station receiving nothing in both the time slot for receipt of the initial status signal and also receiving nothing in the time slot for an ACK or NACK in response to receipt of the data packet). Hence, the probability of the primary station misinterpreting DTX as an ACK or NACK is reduced and the peak power requirement of the uplink channel can be reduced, thereby reducing interference levels. In a preferred embodiment of the present invention, the status signal is a NACK.

According to a second aspect of the present invention there is provided a primary station for use in a communication system having a downlink indicator channel for the transmission of an indicator signal indicating that a data packet is scheduled to be transmitted on a downlink data channel from the primary station to a secondary station, wherein means are provided for receiving on an uplink channel a status signal from the secondary station to indicate receipt of the indicator signal before reception of a positive or negative acknowledgement to indicate the status of the data packet received by the secondary station.

According to a third aspect of the present invention there is provided a secondary station for use in a communication system having a downlink indicator channel for the transmission of an indicator signal indicating that a data packet is scheduled to be transmitted on a downlink data channel from a primary station to the secondary station, wherein receiving means are provided for receiving the indicator signal and the data packet, acknowledgement means are provided for transmitting on an uplink channel a signal to the primary station to indicate the status of the received data packet, and means are provided for transmitting a status signal to indicate receipt of the indicator signal before transmission of a positive or negative acknowledgement to indicate the status of the received data packet.

According to a fourth aspect of the present invention there is provided a method of operating a communication system having a downlink indicator channel for the transmission of an indicator signal indicating that a data packet is scheduled to be transmitted on a downlink data channel from a primary station to a secondary station, the method comprising the secondary station receiving the indicator signal and the data packet, and transmitting on an uplink channel a status signal to indicate receipt of the indicator signal before transmission of a positive or negative acknowledgement to indicate the status of the received data packet.

The present invention is based upon the recognition, not present in the prior art, that transmission of a status signal on receipt of an indication that a data packet is to be transmitted, together with a positive or negative acknowledgement relating to receipt of the data packet itself, reduces the peak uplink power requirements, thereby reducing system interference.

BRIEF DESCRIPTION OF THE DRAWINGS

Embodiments of the present invention will now be described, by way of example, with reference to the accompanying drawings, wherein:

FIG. 1 is a block schematic diagram of a radio communication system;

FIG. 2 is a diagram illustrating the operation of a known stop-and-wait ARQ scheme;

In the drawings the same reference numerals have been used to indicate corresponding features.

DETAILED DESCRIPTION OF THE INVENTION

Figure 3:
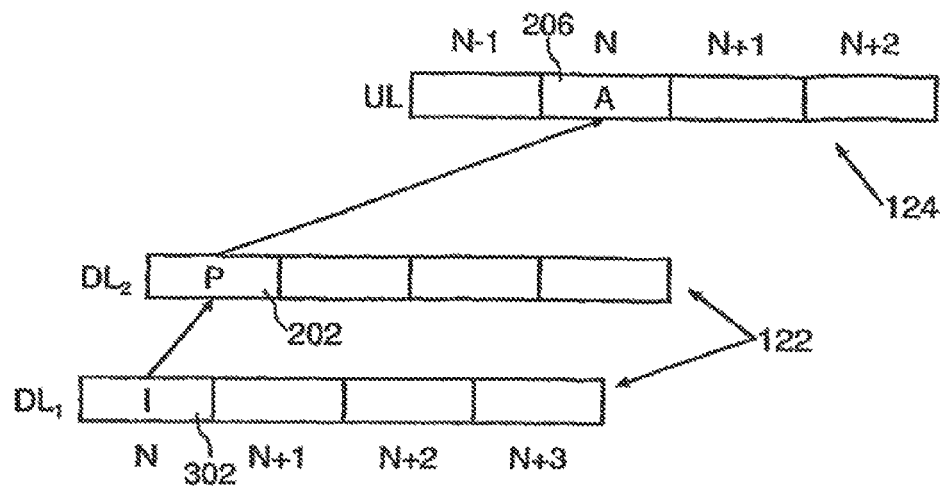
FIG. 3 is a diagram illustrating operation of a basic HSDPA packet transmission scheme.

Referring to FIG. 1, a radio communication system comprises a primary station (BS) 100 and a plurality of secondary stations (MS) 110. The BS 100 comprises a microcontroller (JJC) 102, transceiver means {Tx/Rx} 104 connected to antenna means 106, power control means (PC) 107 for altering the transmitted power level, and connection means 108 for connection to the PSTN or other suitable network. Each MS 110 comprises a microcontroller (IJC) 112, transceiver means (Tx/Rx) 114 connected to antenna means 116, and power control means (PC) 118 for altering the transmitted power level. Communication from BS 100 to MS 110 takes place on a downlink channel 122, while communication from MS 110 to BS 100 takes place on an uplink channel 124.

An example of the operation of a known stop-and-wait ARQ scheme is illustrated in FIG. 2. Data packets 202, identified as Pn, where n is a one-bit sequence number, are transmitted in allocated time slots on a downlink channel {DL} 122 from a BS 100 to a MS 110. The first data packet P 0, with sequence number 0, is received in a corrupted state by the MS 110, which therefore transmits a negative acknowledgement (N) 204 in a field reserved for transmission of positive and negative acknowledgements. In response to this the BS 100 retransmits the first data packet 202, which this time is received correctly by the MS 100 which transmits an acknowledgement (A) 206. The BS 100 then transmits the next packet, with sequence number 1. The BS 100 also retransmits a data packet 202 if it receives no acknowledgement within a predetermined time-out period (in case the MS 110 did not receive the packet at all or the acknowledgement was lost). If the MS 110 did in fact receive the previously transmitted packet 202 it can determine that the received packet 202 is a retransmission as it has the same sequence number as the previous packet.

FIG. 3 illustrates the operation of High-Speed Downlink Packet Access (HSDPA) as currently-specified. FIG. 3 shows in simplified form approximate timing relationships between the various channels used to provide HSDPA. Presence of a data packet 202 scheduled for transmission to the MS 110 is signaled by transmission of an indicator signal I 302 in sub-frame N of a downlink indicator channel DL1 (the High Speed Shared Control Channel, HS-SCCH). This is followed by transmission of the data packet P 202 on a downlink data channel DL2 {the High Speed Downlink Shared Channel, HS-DSCH). If the MS 110 correctly decodes the packet 202 it sends an ACK 206 in sub-frame N of an uplink channel, a High Speed Dedicated Physical Control Channel (HS-DPCCH), as shown. If the packet is not correctly decoded, a NACK 204 is sent instead.

If the MS 110 fails to detect the indicator signal 302, it will not transmit anything (i.e. it uses Discontinuous Transmission, DTX) in sub-frame N of the uplink channel 124. If the BS 100 then wrongly detects the DTX as an ACK 206, the BS will not perform a physical-layer retransmission of the packet. This means that higher-layer protocols are required if the MS 110 is to be able to correctly receive the missed packet; however, such protocols generate significant extra signaling traffic (and hence more interference) and may be too slow for real-time applications.

In order for the BS to limit the probability of wrongly detecting DTX as ACK 206 (a probability of 0.01 seems to be considered acceptable), it must offset its ACK/NACK decision threshold to favor detection of NACKs. However, this means that the power required for ACK messages is increased, and can be as high as 10-20 dB above that required for a normal uplink DPCCH.

A partial solution to this problem, disclosed in our co-pending United Kingdom patent application 0207696.6 (Applicant's reference PHGB 020034), is described with reference to FIG. 4. In this scheme the MS 110 transmits an ACK 206 {as shown) or NACK 204 in sub-frame N of the uplink channel 124, and then continues to transmit NACKs 204 in every uplink sub-frame corresponding to a HS-DSCH sub-frame in which a packet was not detected via the HS-SCCH, as long as a timer is running. In other words, while the timer is running a NACK 204 is transmitted in sub-frame N of the uplink channel 124 unless a data packet 202 was correctly decoded in sub-frame N of the downlink HS-DSCH. In this way, during contiguous (or nearly contiguous) bursts of packets the BS 100 does not have to offset its detection threshold (except perhaps for the first packet in each burst), thereby reducing the required ACK power.

However, a drawback of this scheme is that the BS 100 still has to offset its ACK/NACK decision threshold for the first packet in each burst, or else tolerate a higher misdetection probability for DTX after the first packet. Thus the peak transmit power required for the uplink channel 124 is not improved (unless the BS 100 does not offset its detection threshold for the first packet either, in which case the first packet in each burst will be subject to a higher probability of DTX misinterpretation). Furthermore, if packets only occur individually (i.e. separated by a longer period than the duration of the timer), then the scheme of transmitting NACKs 204 while the timer is running offers no benefit.

An improved scheme, in accordance with the present invention, is described with reference to FIG. 5. In this scheme, when the MS 110 detects a packet indication 302 on the downlink indicator channel it transmits a NACK 204 as a status signal in the sub-frame before the sub-frame in which it would normally transmit the ACK 206 or NACK 204 relating to the data packet 202. In the illustrated scenario, an indicator signal 302 is transmitted in sub-frame N of the indicator channel and in response the MS 110 transmits a NACK 204 in sub-frame N−1 of the uplink channel 124 (unless a data packet has been successfully decoded from sub-frame N−1 of the downlink data channel). In other embodiments of the present invention, the status signal need not be a NACK 204. For example, it could be an ACK 206 or some other suitable signal.

Using this scheme, a communication system can be designed so that the probability of the BS 100 failing to detect that the MS 110 has failed to detect a packet indication 302 transmitted on the downlink indicator channel DL1 is shared between at least two transmissions on the uplink channel 124. Thus if the overall probability of DTX being detected as an ACK 206 is required to be less than 0.01, the power of the NACK transmission in sub-frame N−1 can be set so that the probability of the BS 100 wrongly detecting DTX in sub-frame N−1 as a NACK 204 is 0.1, and the power of the ACK transmission in sub-frame N can be set so that the probability of the BS 100 wrongly detecting DTX in sub-frame N as an ACK 206 is also 0.1. In this way the peak power requirement for the uplink channel 124 is minimized. It follows that the transmit power used for the NACK transmission in sub-frame N−1 may be different from the transmit power used for other NACKs. In fact, it is preferable for the transmit power used for the NACK transmission in sub-frame N−1 to be the same as the transmit power normally used for ACK transmissions.

Figure 4:
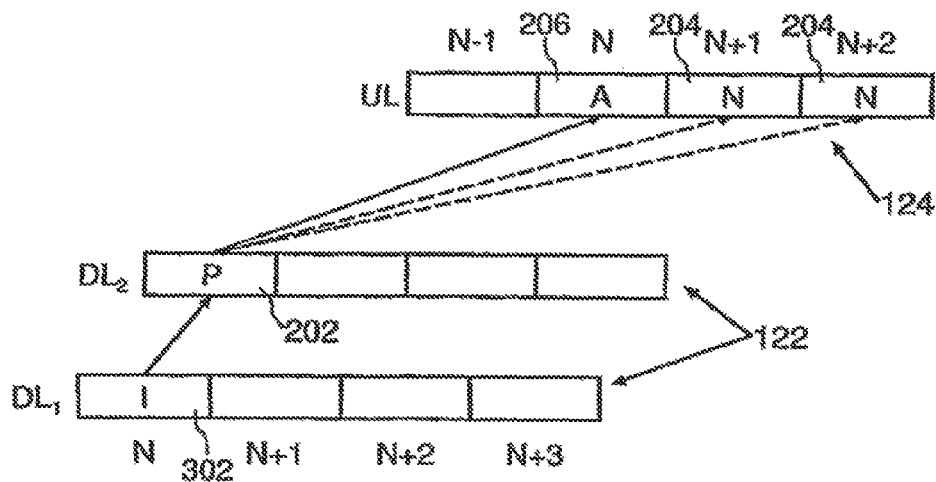
FIG. 4 is a diagram illustrating operation of an improved HSDPA packet transmission scheme including repeated NACKs.
Figure 5:
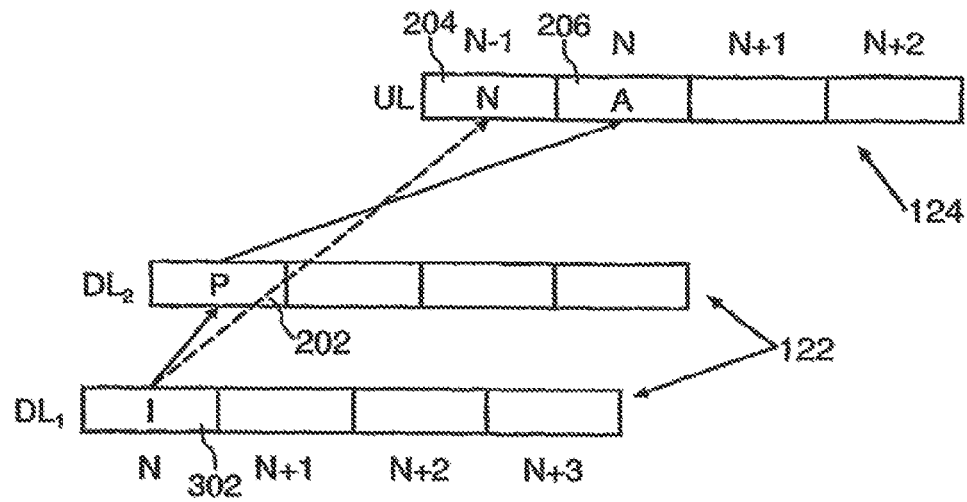
FIG. 5 is a diagram illustrating operation of an improved HSDPA packet transmission scheme including signaling detection of a packet indication.

In a preferred embodiment, the scheme illustrated in FIG. 5 can be combined with that of FIG. 4. In particular, a special case of the behavior in FIG. 4 may be used, whereby the timer runs for exactly one sub-frame after sub-frame N. Thus when an ACK or NACK has been transmitted in sub-frame N, the MS 110 will always transmit in addition a NACK 204 in sub-frame N+1, unless another packet follows immediately in sub-frame N+1 on the downlink data channel and is decoded correctly, in which case an ACK is transmitted in sub-frame N+1 on the uplink channel 124. Accordingly, the BS 100 never has to distinguish a DTX from an ACK 206 in a single sub-frame. A particular advantage of this embodiment of the present invention is that the timer does not need to run for longer than one sub-frame to obtain the benefit of the reduced ACK power requirement.

According to the current HSDPA specifications, it is also possible for a system to require ACKs or NACKs to be repeated a number of times {up to three repeats) in subsequent sub-frames in order to increase their reliability without increasing their transmit power. No packets may be transmitted on the downlink data channel in any sub-frame corresponding to a sub-frame on the uplink channel 124 containing a repeat of an ACK/NACK from a previous packet.

In this case, the present invention could be applied so that the MS 110 transmits NACKs 204 in both sub-frame N−1 and sub-frame N−2 on detection of a packet indication on the indicator channel, in order to keep the power required for this preliminary NACK 204 similar to the power required for the normal ACK/NACK transmissions. However, there is not sufficient time between an indicator signal 302 in sub-frame N of the indicator channel and sub-frame N−3 on the uplink channel 124 for a NACK 204 to be transmitted in sub-frame N−3 of the uplink channel in a system where the number of ACK/NACK repeats is set to a value greater than 1.

Figure 6:
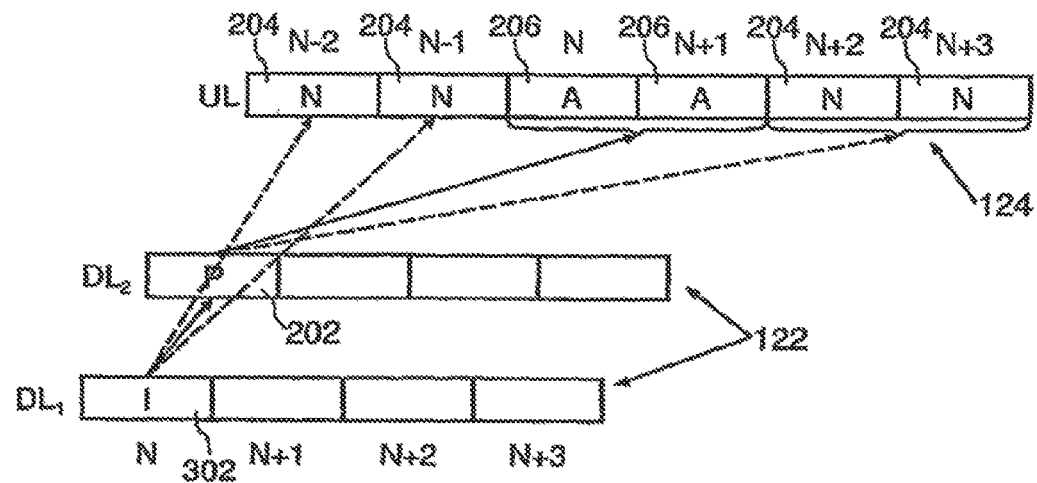
FIG. 6 is a diagram illustrating operation of an improved HSDPA packet transmission scheme including signaling detection of a packet indication and repeated NACKs.

In such a system, the timer could still be used so as to cause a further NACK 204 to be transmitted after the normal ACK/NACK (although the timer would need to run for longer than one sub-frame). In this case, this further NACK would be repeated over the same number of sub-frames as the normal ACK/NACKs, and would follow the last repetition of the normal ACK/NACK. This is illustrated in FIG. 6 for the case where the number of repeats of each ACK/NACK is set at 1.

The presence of a data packet is signaled by an indicator signal 302 in the normal way in sub-frame N. A NACK 204 is then transmitted in sub-frames N−2 and N−1 (unless a packet on the downlink data channel in sub-frame N−2 has already has been correctly decoded, in which case an ACK 206 is sent in sub-frames N−2 and N−1). If the packet is correctly decoded, then an ACK 206 is sent on the uplink channel 124 in sub-frame N, and repeated in sub-frame N+1. No packet may be transmitted on the downlink data channel in sub-frame N+1. If the packet is not correctly decoded, a NACK 206 is sent on the uplink channel 124 in sub-frame N and repeated in sub-frame N+1. Additionally, according to the use of the timer, a NACK 204 is always sent in sub-frames N+2 and N+3 of the uplink channel 124, unless a packet is correctly decoded from sub-frame N+2 on the downlink data channel, in which case an ACK 206 is sent in sub-frames N+2 and N+3.

It may be desirable to be able to switch transmission of a NACK 206 to indicate reception of an indicator signal 302 on and off by means of signaling from the BS 100. This signaling may be combined with switching on and off the timer for transmission of NACKs 204 after the normal packet acknowledgement (i.e. both aspects switched on or off together), alternatively the two aspects may be switched on and off independently of each other. The switching could be determined by the state of the MS 110, for example whether or not it is in soft handover, or the selected number of repeats of ACKs and NACKs.

One example where it could be desirable to switch off the use of the present invention is if the BS 100 is specifically trying to detect DTX as a separate case from NACK. This may be the case if, for example, different redundancy versions are used for retransmissions, in which case they cannot be directly combined in the same soft-buffer at the MS 110. This would not, however, present a problem if Chase combining were used.

Figure 7:
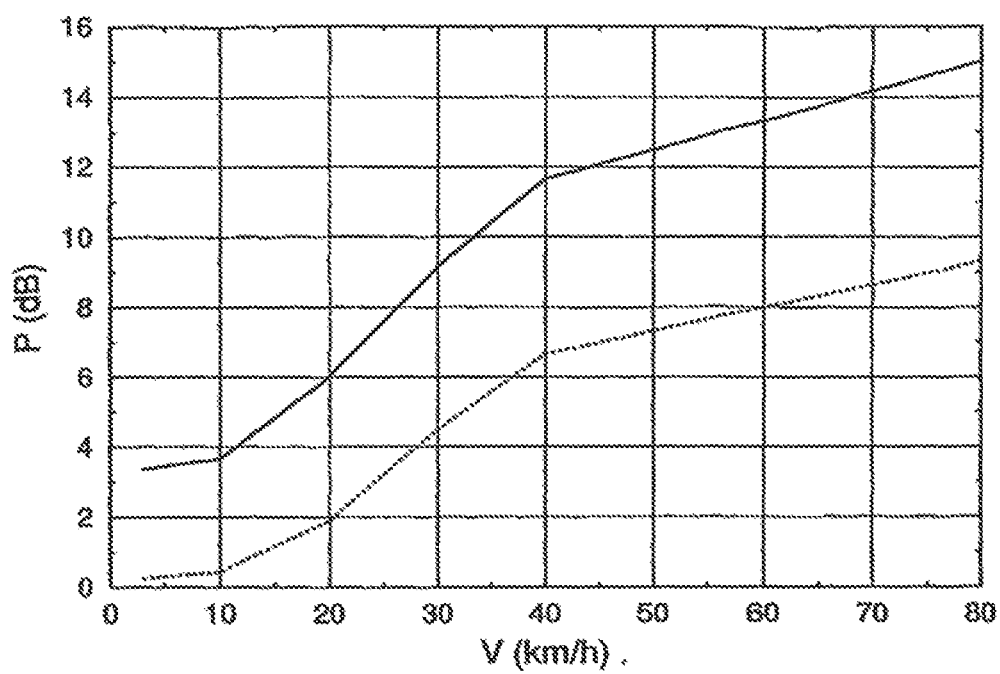
FIG. 7 is a graph showing peak power requirement for the schemes of FIG. 3 (shown as a solid line) and FIG. 6 (shown as a dashed line)

Simulation results showing the benefit (in terms of peak uplink channel 124 power requirement of the present-invention, combined with a 1-sub-frame timer, are shown in FIG. 7. This is a graph of P, the peak uplink power requirement relative to the normal uplink (DPCCH) transmission power, in dB against V, the speed of the MS 110 in km/h. In this simulation the overall probability of mis-detecting DTX as ACK 206 is required to be 0.01. Power requirements without an initial NACK or subsequent timer are shown as a solid line, and requirements with an initial NACK and subsequent one sub-frame duration timer are shown as a dashed line. It can be seen that use of the two techniques together provides a benefit of between 3 and 6 dB.

Figure 8:
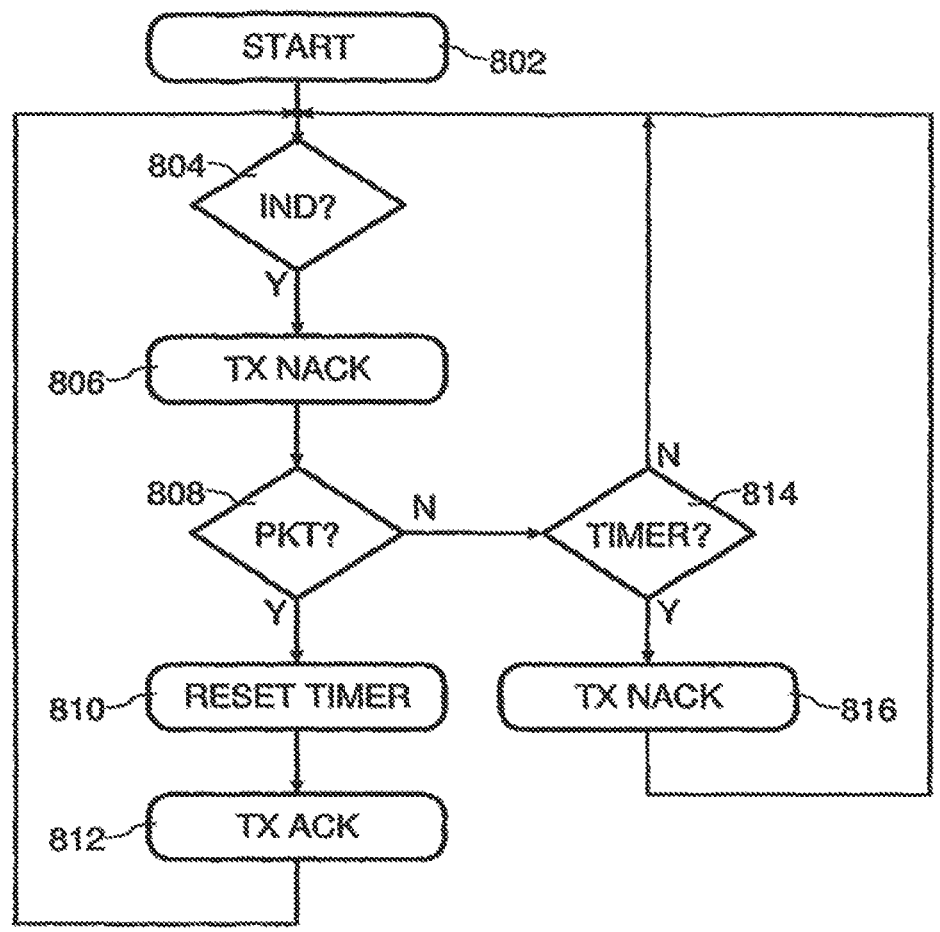
FIG. 8 is a flow chart showing a method of operating a packet data transmission system in accordance with the present invention.

The operation of such a combined scheme is summarized by the flowchart shown In FIG. 8. The method starts, at step 802, when the MS 110 is ready to receive data packets 202. Test 804 relates to the MS 110 determining whether an indicator signal 302 for a data packet has been received. If the MS has received the indicator signal, at step 806, the MS 110 transmits a negative acknowledgement (NACK) and proceeds to receive the data packet. Test 808 relates to the MS 110 determining whether the data packet has been received successfully. At step 810, if a data packet 202 is successfully received, test 808 is passed and the timer is reset. At step 812, an acknowledgement 206 is transmitted from the MS and the MS 110 returns to test 804 to check for an indicator signal 302. Resetting the timer may involve starting a timer, if one is not already running, or restarting an already-running timer.

If the data packet is not successfully received, test 808 is failed and a further test 814 is made to determine whether the timer is running. If the timer is running, the test 814 is passed and the MS 110 transmits, at step 816, a negative acknowledgement 204 in the corresponding ACK/NACK field, and then returns to test 804. If the timer is not running, test 814 is failed and the MS 110 returns directly to test 804.

The above description is directed primarily but not exclusively at UMTS FDD (Frequency Division Duplex) mode. However, the invention could also be applied to TDD (Time Division Duplex) mode. When applied to the TDD mode, the fact that the uplink and downlink channel use different time slots at the same frequency (i.e. reciprocal channel} could beneficially reduce the need for signaling of channel information.

The description above relates, in one aspect, to the BS 100 performing a variety of roles in relation to the present invention. In practice these tasks may be the responsibility of a variety of parts of the fixed infrastructure, for example in a "Node 8", which is the part of the fixed infrastructure directly interfacing with a MS 110, or at a higher level in the Radio Network Controller (RNC}. In this specification, the use of the term "base station" or "primary station" is therefore to be understood to include the parts of the network fixed infrastructure involved in an embodiment of the present invention.

From reading the present disclosure, other modifications will be apparent to persons skilled in the art. Such modifications may involve other features which are already known in the design, manufacture and use of communication systems and component parts thereof, and which may be used instead of or in addition to features already described herein.

In the present specification and claims the word a" or "an" preceding an element does not exclude the presence of a plurality of such elements. Further, the word "comprising" does not exclude the presence of other elements or steps than those listed.

The invention claimed is:

1. A communication system having a downlink indicator channel for the transmission of an indicator signal indicating that a data packet is scheduled to be transmitted on a downlink data channel from a primary station to a secondary station,
the secondary station including:
a receiver for receiving, at the secondary station, the indicator signal and the data packet,
a transmitter configured to transmit a signal from the secondary station to the primary station to indicate the status of the received data packet, wherein the transmitter is further configured to transmit a status signal from the secondary station on an uplink channel (UL) to indicate receipt of the indicator signal by the secondary station before transmission of a positive or negative acknowledgement by the secondary station to indicate the status of the received data packet, wherein the uplink channel is divided into a plurality of sub-frames, wherein the status signal and the acknowledgement are transmitted in consecutive sub-frames.

2. The communication system as claimed in claim 1, wherein the status signal is the same signal as that used for a negative acknowledgement.

3. The communication system as claimed in claim 1, wherein the status signal is transmitted at the same power as a positive acknowledgement.

4. The communication system as claimed in claim 1, wherein the secondary station further comprises a microcontroller for resetting a timer on receipt of the indicator signal and for modifying a characteristic of uplink transmissions until the timer expires.

5. The communication system as claimed in claim 4, wherein the transmitter further transmits a negative acknowledgement for each time at which a data packet could have been transmitted if no transmission of a data packet is detected, and in that such negative acknowledgements are only transmitted until the timer expires.

6. The communication system as claimed in claim 4, wherein the timer has a duration of one sub-frame.

7. The communication system as claimed in claim 4, wherein the transmitter further transmits a positive or negative acknowledgement of a received data packet N times, where N is predetermined, and for transmitting subsequent negative acknowledgements until the timer expires.

8. The communication system as claimed in claim 4, wherein the timer has a duration of N sub-frames.

9. The communication system as claimed in claim 1, wherein the transmitter further transmits a plurality of status signals before transmission of the acknowledgement.

10. A primary station for use in a communication system having a downlink indicator channel for the transmission of an indicator signal indicating that a data packet is scheduled to be transmitted on a downlink data channel from the primary station to a secondary station, the primary station including:
a transmitter configured to transmit the indicator signal indicating that the data packet is scheduled to be transmitted on the downlink data channel from the primary station to a secondary station,
a receiver configured to receive on an uplink channel (UL) a status signal from the secondary station to indicate receipt of the indicator signal before reception at the secondary station of a positive or negative acknowledgement to indicate the status of the data packet received by the secondary station, wherein the uplink channel is divided into a plurality of sub-frames, wherein the status signal and the acknowledgement are received in consecutive sub-frames.

11. The primary station as claimed in claim 10, wherein the status signal is the same signal as that used for a negative acknowledgement.

12. The primary station as claimed in claim 10, wherein the status signal is transmitted at the same power as a positive acknowledgement.

13. A secondary station comprising:
a receiver configured to receive an indicator signal and a data packet from a primary station; and
a transmitter configured to transmit a status signal to the primary station, the status signal being indicative of the reception of the indicator signal and an acknowledgment signal including a positive acknowledgement or a negative acknowledgement for indicating a status of the received data packet, wherein the status signal and the acknowledgment signal are transmitted in consecutive sub-frames.

14. The secondary station of claim 13, wherein the status signal is a same signal as that used for a negative acknowledgement.

15. The secondary station of claim 13, further comprising a timer and a microcontroller, the microcontroller being configured to be reset the timer on receipt of the indicator signal, and wherein the transmitter is further configured to transmit negative acknowledgements for each time a data packet could have been transmitted if no transmission of a data packet is detected, and wherein the negative acknowledgements are only transmitted until the timer expires.

16. The secondary station as claimed in claim 13, wherein the status signal is transmitted at a same power as a positive acknowledgement.

17. The secondary station as claimed in claim 13, wherein the transmitter is configured to transmit negative acknowledgements for each time at which a data packet could have been transmitted if no transmission of a data packet is detected, and wherein the negative acknowledgements are transmitted until the timer expires.

18. The secondary station as claimed in claim 17 wherein the timer has a duration of one sub-frame.

19. The secondary station as claimed in claim 17, wherein the timer has a duration of N sub-frames.

20. The secondary station as claimed in claim 17, wherein the transmitter is configured to transmit a positive or negative acknowledgement of a received data packet N times, where N is predetermined, and wherein the transmitter is configured to transmit subsequent negative acknowledgements until the timer expires.

21. The secondary station as claimed in claim 20, wherein the transmitter is configured to transmit a plurality of status signals before transmission of the positive or negative acknowledgment to indicate the status of the received data packet.

22. A secondary station for use in a communication system, the secondary station comprising:
a receiver configured to receive an indicator signal via a downlink indicator channel and the data packet via a downlink data channel; and
a transmitter being configured to transmit a positive or negative acknowledgement to the primary station to indicate a status of the received data packet via an uplink channel, the uplink channel being divided into a plurality of consecutive sub-frames, wherein the transmitter is further configured to transmit a status signal in a sub-frame immediately before a sub-frame in which the secondary station transmits the positive or negative acknowledgement to indicate the status of the received data packet, and wherein the status signal is indicative of the receipt of the indicator signal.

23. The secondary station as claimed in claim 22, wherein the status signal is a same signal as that used for a negative acknowledgement.

24. The secondary station as claimed in claim 22, wherein the status signal is transmitted at a same power as a positive acknowledgement.

25. The secondary station as claimed in claim 22, further comprising a timer and a microcontroller, the microcontroller being configured to be reset the timer on receipt of the indicator signal, and wherein the transmitter is further configured to transmit negative acknowledgements for each time a data packet could have been transmitted if no transmission of a data packet is detected, and wherein the negative acknowledgements are only transmitted until the timer expires.

26. The secondary station as claimed in claim 25, wherein the transmitter is configured to transmit negative acknowledgements for each time at which a data packet could have been transmitted if no transmission of a data packet is detected, and wherein the negative acknowledgements are only transmitted until the timer expires.

27. The secondary station as claimed in claim 25, wherein the timer has a duration of one sub-frame.

28. The secondary station as claimed in claim 25, wherein the timer has a duration of N sub-frames.

29. The secondary station as claimed in claim 22, wherein the transmitter is configured to transmit a positive or negative acknowledgement of a received data packet N times, where N is predetermined, and for transmitting subsequent negative acknowledgements until the timer expires.

30. The secondary station as claimed in claim 22, wherein the transmitter is configured to transmit a plurality of status signals before transmission of the positive or negative acknowledgment to indicate the status of the received data packet.

31. The secondary station as claimed in claim 22, wherein the downlink indicator channel is a High Speed Shared Control Channel, and wherein the downlink data channel is a High Speed Downlink Shared Data Channel.

32. The secondary station as claimed in claim 22, wherein the secondary station is configured to operate in a communication system based on one of Time Division Duplex (TDD) or Frequency Division Duplex (FDD).

33. A method of operating a secondary station in a communication system having a downlink indicator channel for the transmission of an indicator signal indicating that a data packet is scheduled to be transmitted on a downlink data channel from a primary station to the secondary station, the method comprising:

receiving at the secondary station, in a first transmission, the indicator signal on the downlink indicator channel;

receiving at the secondary station, in a second transmission, the data packet on the downlink data channel, and transmitting from the secondary station on an uplink channel (UL) a status signal to indicate receipt of the indicator signal before transmission of a positive or negative acknowledgement to indicate the status of the received data packet, wherein the uplink channel is divided into a plurality of sub-frames, wherein the status signal and the acknowledgement are received in consecutive sub-frames.

34. The method as claimed in claim 33, wherein the status signal is the same signal as that used for a negative acknowledgement.

35. The method as claimed in claim 33, wherein the status signal is transmitted at the same power as a positive acknowledgement.

36. The method as claimed in claim 33, further comprising resetting a timer on receipt of the indicator signal and for modifying a characteristic of uplink transmissions until the timer expires.

37. The method as claimed in claim 36, further comprising transmitting a negative acknowledgement for each time at which a data packet could have been transmitted if no transmission of a data packet is detected, and in that such negative acknowledgements are only transmitted until the timer expires.

38. The method as claimed in claim 36, wherein the timer has a duration of one sub-frame.

39. The method as claimed in claim 33, further comprising transmitting a positive or negative acknowledgement of a received data packet N times, where N is predetermined, and for transmitting subsequent negative acknowledgements until the timer expires.

40. The method as claimed in claim 33, wherein the timer has a duration of N sub-frames.

* * * * *